US009477638B2

(12) United States Patent
Kats

(10) Patent No.: US 9,477,638 B2
(45) Date of Patent: Oct. 25, 2016

(54) SURFACE ACOUSTIC WAVE SCALE THAT AUTOMATICALLY UPDATES CALIBRATION INFORMATION

(71) Applicant: Circuits & Systems, Inc., East Rockaway, NY (US)

(72) Inventor: Vyacheslav D. Kats, East Rockaway, NY (US)

(73) Assignee: CIRCUITS & SYSTEMS, INC., East Rockaway, NY (US)

( * ) Notice: Subject to any disclaimer, the term of this patent is extended or adjusted under 35 U.S.C. 154(b) by 955 days.

(21) Appl. No.: 13/742,713

(22) Filed: Jan. 16, 2013

(65) Prior Publication Data

US 2013/0185011 A1   Jul. 18, 2013

Related U.S. Application Data

(60) Provisional application No. 61/587,309, filed on Jan. 17, 2012.

(51) Int. Cl.
*G01G 3/16*  (2006.01)
*G01G 23/01* (2006.01)
*G06F 17/00* (2006.01)
*G01G 3/13*  (2006.01)
*G01G 3/18*  (2006.01)

(52) U.S. Cl.
CPC ............... *G06F 17/00* (2013.01); *G01G 3/13* (2013.01); *G01G 3/16* (2013.01); *G01G 3/18* (2013.01); *G01G 23/01* (2013.01)

(58) Field of Classification Search
CPC ............ G01G 3/13; G01G 3/16; G01G 3/18; G06F 17/00
See application file for complete search history.

(56) References Cited

U.S. PATENT DOCUMENTS

| 4,096,740 | A |   | 6/1978  | Sallee |
|-----------|---|---|---------|--------|
| 4,107,626 | A |   | 8/1978  | Kiewit |
| 4,294,321 | A |   | 10/1981 | Wittlinger et al. |
| 4,361,026 | A |   | 11/1982 | Muller et al. |
| 4,412,298 | A | * | 10/1983 | Feinland ............ G01G 23/3707 177/25.14 |
| 4,623,813 | A |   | 11/1986 | Naito et al. |
| 4,660,662 | A | * | 4/1987  | Katz ................. G01G 23/3707 177/185 |
| 4,691,290 | A | * | 9/1987  | Griffen ............... G01G 3/1414 177/25.13 |
| 4,858,145 | A |   | 8/1989  | Innoue et al. |

(Continued)

OTHER PUBLICATIONS

"Progress in the Development of SAW Resonator Pressure Transducers" by Cullen et al., 1980 Ultrasonics Symposium, pp. 696-701.

(Continued)

*Primary Examiner* — Randy W Gibson
(74) *Attorney, Agent, or Firm* — Gordon & Jacobson, P.C.

(57) ABSTRACT

Apparatus and related methods are provided for automatically recalibrating a SAW scale for changing environmental factors. During a period of time when there is no change to a weight applied to the scale, readings of SAW transducers which relate to weight indications and environmental factor indications are taken for two adjacent operating modes of the scale, and two calibrated weight calculations are made utilizing those readings. The difference in calibrated weight calculations is then related to a variable utilized to transform the readings into weights, which is updated, thereby recalibrating the scale.

13 Claims, 8 Drawing Sheets

(56) References Cited

U.S. PATENT DOCUMENTS

| | | | |
|---|---|---|---|
| 4,957,177 A | | 9/1990 | Hamilton et al. |
| 5,166,892 A | * | 11/1992 | Inoue .................... G01D 3/02 |
| | | | 324/130 |
| 5,174,400 A | * | 12/1992 | Hasegawa ............. G01G 19/42 |
| | | | 177/165 |
| 5,476,002 A | | 12/1995 | Bowers et al. |
| 5,663,531 A | | 9/1997 | Kats |
| 5,910,647 A | | 6/1999 | Kats et al. |
| 6,211,473 B1 | | 4/2001 | Kats et al. |
| 6,448,513 B1 | | 9/2002 | Kats et al. |

OTHER PUBLICATIONS

"Pressure and Acceleration Sensitivity of SAW Interferometer" by Staples et al., 1981 Ultrasonics Symposium, pp. 155-158.

"Displacement Measurement by SAW Delay-Line Oscillator Consisting of Two LiNbO3 Plates with IDT" by Ishido et al., 1987 IEEE, pp. 83-86.

"A 200 MHz Surface Acoustic Wave Resonator Mass Microbalance" by Bowers et al., Jun. 1991, Review of Scientific Instruments, pp. 1624-1629.

* cited by examiner

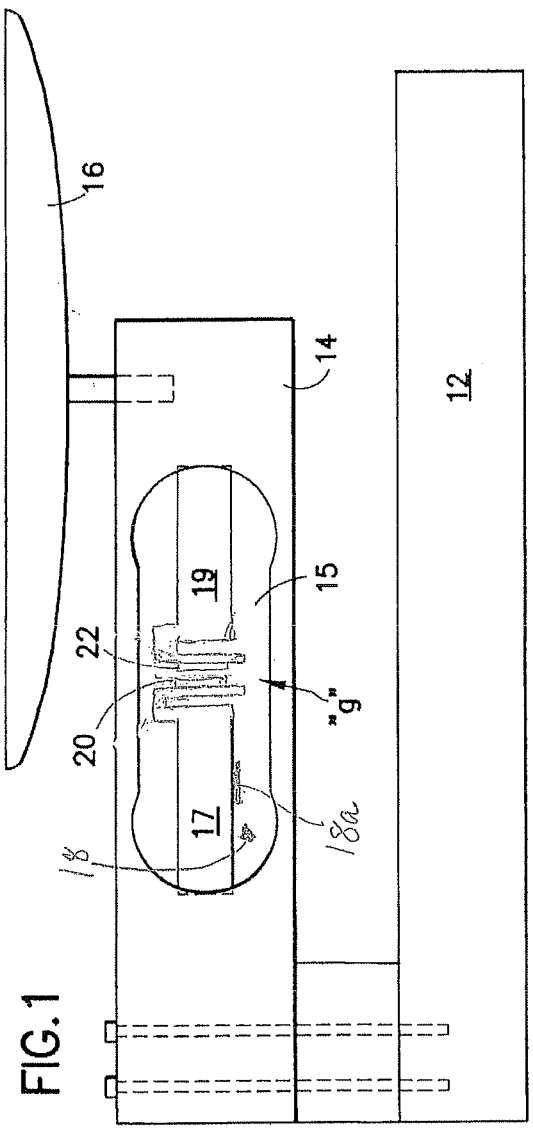
FIG. 1
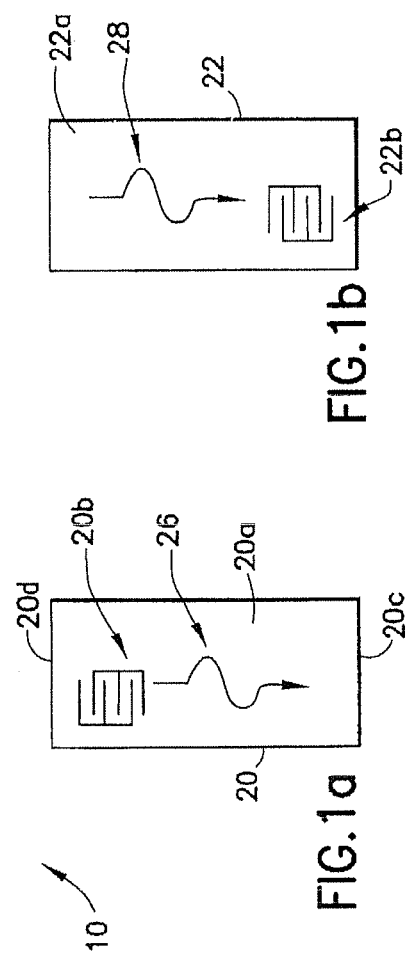
FIG. 1a
FIG. 1b

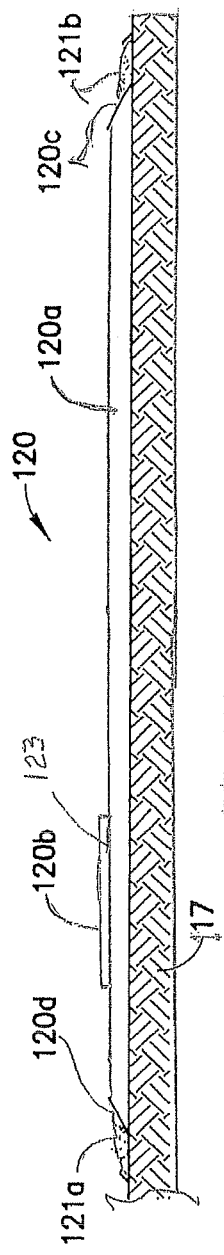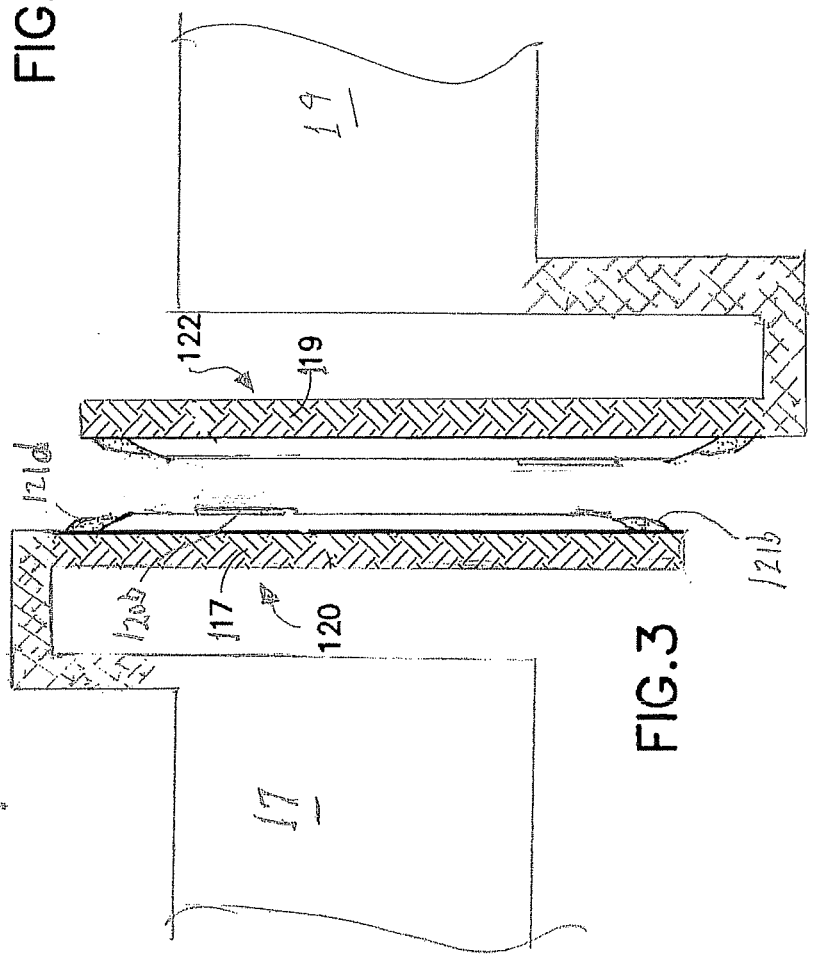

SURFACE ACOUSTIC WAVE SCALE THAT AUTOMATICALLY UPDATES CALIBRATION INFORMATION

CROSS-REFERENCE TO RELATED APPLICATIONS

This application claims benefit from U.S. Ser. No. 61/587,309, filed Jan. 17, 2012, which is hereby incorporated by reference herein in its entirety.

The application is also related to co-owned Ser. No. 09/775,748, filed Feb. 2, 2001, now U.S. Pat. No. 6,448,513, Ser. No. 09/327,707 filed Jun. 9, 1999, now U.S. Pat. No. 6,211,473, Ser. No. 08/729,752 filed Oct. 7, 1996, now U.S. Pat. No. 5,910,647, and Ser. No. 08/489,365 filed Jun. 12, 1995, now U.S. Pat. No. 5,663,531, the complete disclosures of which are hereby incorporated by reference herein.

BACKGROUND

1. Field

This relates to electronic weighing devices, and more particularly to an electronic weighing device that employs surface acoustic waves to measure weight.

2. State of the Art

Precision electronic weighing devices are widely known in the art and there are many different technologies utilized in these electronic weighing devices. Laboratory scales or "balances" typically have a capacity of about 1,200 grams and a resolution of about 0.1 gram, although scales with the same resolution and a range of 30,000 grams are available. The accuracy of these scales is achieved through the use of a technology known as magnetic force restoration. Generally, magnetic force restoration involves the use of an electromagnet to oppose the weight on the scale platform. The greater the weight on the platform, the greater the electrical current needed to maintain the weight. While these scales are very accurate (up to one part in 120,000), they are expensive and very sensitive to ambient temperature. In addition, their range is relatively limited.

Most all other electronic weighing devices use load cell technology. In load cell scales, the applied weight bends an elastic member which has strain gauges bonded to its surface. The strain gauge is a fine wire which undergoes a change in electrical resistance when it is either stretched or compressed. A measurement of this change in resistance yields a measure of the applied weight. Load cell scales are used in non-critical weighing operations and usually have a resolution of about one part in 3,000. The maximum resolution available in a load cell scale is about one part in 10,000 which is insufficient for many critical weighing operations. However, load cell scales can have a capacity of several thousand pounds.

While there have been many improvements in electronic weighing apparatus, there remains a current need for electronic weighing apparatus which have enhanced accuracy, expanded range, and low cost.

The previously incorporated applications disclose an electronic weighing apparatus having a base which supports a cantilevered elastic member upon which a load platform is mounted. The free end of the elastic member is provided with a first piezoelectric transducer and a second piezoelectric transducer is supported by the base. Each transducer includes a substantially rectangular piezoelectric substrate and a pair of electrodes imprinted on the substrate at one end thereof, with one pair of electrodes acting as a transmitter and the other pair of electrodes acting as a receiver. The transducers are arranged with their substrates substantially parallel to each other with a small gap between them and with their respective electrodes in relatively opposite positions. The receiver electrodes of the second transducer are coupled to the input of an amplifier and the output of the amplifier is coupled to the transmitter electrodes of the first transducer. The transducers form a "delay line" and the resulting circuit of the delay line and the amplifier is a positive feedback loop, i.e. a natural oscillator. More particularly, the output of the amplifier causes the first transducer to emit a surface acoustic wave ("SAW") which propagates along the surface of the first transducer substrate away from its electrodes. The propagating waves in the first transducer induce an oscillating electric field in the substrate which in turn induces similar SAW waves on the surface of the second transducer substrate which propagate in the same direction along the surface of the second transducer substrate toward the electrodes of the second transducer. The induced waves in the second transducer cause it to produce an alternating voltage which is supplied by the electrodes of the second transducer to the amplifier input. The circuit acts as a natural oscillator, with the output of the amplifier having a particular frequency which depends on the physical characteristics of the transducers and their distance from each other, as well as the distance between the respective electrodes of the transducers.

When a load is applied to the load platform, the free end of the cantilevered elastic member moves and causes the first transducer to move relative to the second transducer. The movement of the first transducer relative to the second transducer causes a change in the frequency at the output of the amplifier. The movement of the elastic member is proportional to the weight of the applied load and the frequency and/or change in frequency at the output of the amplifier can be calibrated to the displacement of the elastic member. The frequency response of the delay line is represented by a series of lobes. Each mode of oscillation is defined as a frequency where the sum of the phases in the oscillator is an integer multiple of $2\pi$. Thus, as the frequency of the oscillator changes, the modes of oscillation move through the frequency response curve and are separated from each other by a phase shift of $2\pi$. The mode at which the oscillator will most naturally oscillate is the one having the least loss. The transducers are arranged such that their displacement over the weight range of the weighing apparatus causes the oscillator to oscillate in more than one mode. Therefore, the change in frequency of the oscillator as plotted against displacement of the transducers is a periodic function. There are several different ways of determining the cycle of the periodic function so that the exact displacement of the elastic member may be determined.

It is generally known in the art of SAW technology that the frequency range in which the losses are the lowest is not necessarily the frequency range in which the oscillator exhibits the best phase linearity. From the teachings of the previously incorporated applications, those skilled in the art will appreciate that in a SAW displacement transducer such as disclosed in the previously incorporated applications, better phase linearity provides a more linear relationship between frequency and displacement. In the case of a weighing apparatus using a SAW displacement transducer as described in the previously incorporated applications, better phase linearity will result in a more linear relationship between weight and frequency.

It is known in the art of SAW oscillators that changing the topology of the oscillator transmitter and receiver can cause a broader bandwidth of the delay line and that a broader bandwidth results in better phase linearity. It is also known that using a smaller frequency range provides better linearity and that a smaller frequency range can be obtained with a longer delay line. Although these known methods can increase phase linearity in a SAW oscillator, the frequency range in which the best linearity is achieved for a particular oscillator is still not necessarily the range with the lowest losses.

From the foregoing, those skilled in the art will appreciate that in order to enhance the accuracy of a SAW displacement transducer such as that used in a weighing device, it would be desirable to cause the SAW oscillator to oscillate in the range having the best phase linearity.

As disclosed in the previously incorporated applications, weighing accuracy is affected by temperature. The previously incorporated applications disclose a SAW temperature oscillator having a transmitter and receiver on the same substrate. The temperature sensitivity of the load cell disclosed in the previously incorporated applications is approximately 500 ppm of the weight reading per 1° C. temperature change. Accuracy of 100 ppm of the weight reading can be achieved if temperature is measured to within 0.2° C. which represents a shift of about 1 kHz of the SAW temperature sensor. This shift is easy to measure in the short term. The resolution of the SAW temperature sensor is on the order of 0.001° C. However, the long term stability of the SAW temperature sensor can drift more than 1 kHz due to many factors including humidity.

In order to overcome some of these issues, co-owned application Ser. No. 09/775,748 (U.S. Pat. No. 6,448,513) discloses as one aspect the use of a "push oscillator" coupled to the delay line for injecting a strong RF signal at a frequency in the middle of the oscillation mode which exhibits the best phase linearity. The frequency of the "push oscillator" is determined experimentally when the scale is calibrated. The RF signal is injected periodically in short bursts. According to a second aspect of the same patent, the "push oscillator" frequency is generated by mixing the temperature oscillator with an adjustable fixed frequency oscillator. This immunizes the "push oscillator" from the affects of temperature. According to a third aspect of the same patent, a thermistor is provided for long term temperature stability. The SAW temperature sensor is periodically calibrated to the thermistor. According to a fourth aspect of the same patent, the SAW oscillators are not hermetically sealed and the SAW temperature sensor is used to correct the displacement sensor for changes in environmental conditions such as humidity.

Even with these improvements, SAW scales still do not meet certain criteria that are desirable for high accuracy scales. For example, while the zero stability of such SAW scales is in the desirable range of 1:50,000 to 1:100,000 (for a temperature range of 10° C.-40° C.), the stability of the span parameter (the weight reading after having zeroed the scale) is typically as low as around 1:10,000. It is desirable that the span parameter be in the same range (i.e., 1:50,000 to 1:100,000) as the zero stability.

The main cause of this problem is the fact that the process of determining the load for the scale consists of measuring the frequency of the SAW transducer under two conditions—first without load (the zero value) and the other under load from the platform (the weight value). A quality of the SAW scale is that zero stability and the span parameter stability for these two frequencies depends on their values within the pass band of the transducer. The zero stability for every point inside the pass band is very similar, but does have slight variations. As an example, without any load on the platform, the frequency of the delay line oscillator could be 92.9 MHz. Under load it could be 93.1 MHz. In this example the span parameter for a single mode is 200,000 Hz (0.2 Mhz). If the scale utilizes multiple modes, the span parameter is effectively 200,000 Hz times the number of modes of the scale. For five modes, the span parameter of the scale is effectively 1.0 MHz.

The span parameter is also dependent upon temperature. For example, for the exemplary spam parameter described above, the frequency of the delay line oscillator without load for two different temperatures can change (i.e., drift) by 1000 Hz, and the frequency of the delay line oscillator under load for the same two temperatures can change (i.e., drift) by 1050 Hz. This is a difference of 50 Hz and is referred to as absolute span drift. In this example, the relative span drift (absolute span drift/span parameter) is 50 Hz/200,000 Hz (1:4000) (for a single mode), which is considered to be a poor result for a high accuracy scale. If the scale utilizes five modes, the absolute span drift (50 Hz) will be the same, but the full range will be five times larger and as a result the relative span drift will drop to 1:20,000, which is still higher than desired. In addition, this error will appear as a discontinuity and as a linearity distortion at the points of the border between modes.

In addition, given the wide range of temperatures under which industrial scales operate, −20° C. to +60° C., there is the potential for measurement error due to the mismatching of coefficients of thermal expansion (CTE) between the SAW transducer substrate and the material of the load cell. The transducer substrate is bonded to the load cell using a holder which is made from the same material as the remainder of the load cell; typically, a suitable alloy of aluminum. The transducer substrate and the holder material have significantly different CTEs which will subject the bonding line of the materials to a thermal stress. If the temperature changes significantly, the thermal stress between the materials, including the bonding line, causes some change on the zero reading of the scale which is determined by the exact position of the transducer substrate. Because the bonding material has some level of hysteresis and non-repeatability under stress, the shift of the zero reading can be very unpredictable. Various methods are known for bonding materials with mismatched CTEs, including high temperature or pressure bonding, including brazing or diffusion, or machining operations, including drilling holes or riveting. However, the transducer substrate material is not suitable for these kinds of operations because of fragility and high temperature concerns.

SUMMARY

According to one aspect, a method and apparatus are provided for automatically recalibrating a SAW scale for changing environmental factors. In this aspect, during a period of time when there is no change to weight applied to the scale (e.g., when there is no weight being applied to the scale), readings of SAW transducers which relate to weight indications and environmental factor indications are taken for each one of two adjacent operating modes of the scale, and two calibrated weight calculations are made utilizing those readings. The difference in calibrated weight calculations is then related to a variable utilized to transform the readings into weights, which is updated, thereby recalibrating the scale. Recalibration in this manner significantly reduces span drift and enhances linearity.

According to another aspect, an auxiliary sensor that is used to ascertain the operating mode of the SAW scale is adjusted (calibrated) by comparing the reading of the SAW sensor and the reading of the auxiliary sensor.

According to a further aspect, the SAW transducer is fabricated on a lithium niobate piezosubstrate and attached by glue to a metal holder. The thickness of the piezosubstrate is in a range between 0.1 and 0.3 mm and the thickness of the holder is at least ten times thicker than the piezosubstrate so that the piezosubstrate and holder can bend together without over-stressing the glue layer. In this manner stress on the glue is reduced during ambient temperature changes, thereby reducing or eliminating random hysteresis effects and resulting zero shifts.

According to one assembly of the transducer the metal holder, the SAW transducer is fabricated on a lithium niobate piezosubstrate and attached by glue to a metal holder where the metal holder is chosen to be between one and 3.5 times the thickness of the piezosubstrate. In this manner, the aluminum holder and piezosubstrate will bend and stretch together without over-stressing the glue layer.

According to yet another assembly, in order to further minimize thermal stress, the SAW transducer is fabricated on a lithium niobate piezosubstrate, the metal holder is machined with a cantilevered beam that is permitted relative free rotation around the point at which it is connects to the main body of the holder. The lithium niobate piezosubstrate is bonded with a bonding agent at one end to the holder and at its other end the free end of the beam. In this manner, as the piezosubstrate stretches or shrinks due to temperature changes, the beam will bend with the piezosubstrate without over-stressing the bonding locations.

According to even another assembly, in order to still further minimize thermal stress, the SAW transducer is fabricated on a lithium niobate piezosubstrate, the piezosubstrate is bonded with a bonding agent to an intermediate bonding plate having a coefficient of thermal expansion (CTE) that closely matches that of the piezosubstrate. The intermediate bonding plate, which has a relatively different CTE from the metal holder, is bonded to the metal holder without a bonding agent. One embodiment of a bond between the intermediate plate and the metal holder comprises two pins offset out of the bonding line of the piezosubstrate and spaced relatively close together to reduce thermal stress between the pins as the SAW transducer is subject to thermal changes. In this manner, as the piezosubstrate stretches or shrinks due to temperature changes, the intermediate plate will similarly stretch or shrink without resulting in overstressing the bond between the piezosubstrate and the intermediate plate.

In accord with yet another assembly, in order to minimize thermal stress, the SAW transducer is fabricated on a lithium niobate piezosubstrate, the piezosubstrate is bonded with a bonding agent to an intermediate bonding plate having a closely matched CTE with the piezosubstrate, and the metal holder is machined with a cantilevered beam that is permitted relative free rotation around the point at which it is connects to the main body of the holder. The intermediate bonding plate is bonded to the metal holder with two pins, one extending into the cantilevered beam on one side of the piezosubstrate and one extending in the body of the holder on the other size of the piezosubstrate. By bonding to the cantilevered beam, stress is reduced even under harsh thermal cycling conditions.

BRIEF DESCRIPTION OF THE DRAWINGS

FIG. 1 is a schematic side elevation view of an exemplary embodiment.

FIG. 1a is an enlarged schematic plan view of a first transducer.

FIG. 1b is an enlarged schematic plan view of a second transducer.

FIG. 2 is an enlarged schematic side elevation view of a transducer having anti-reflection structure.

FIG. 3 is an enlarged schematic side elevation view of a pair of transducers according to one embodiment.

DETAILED DESCRIPTION OF THE EMBODIMENTS

Figure 4:
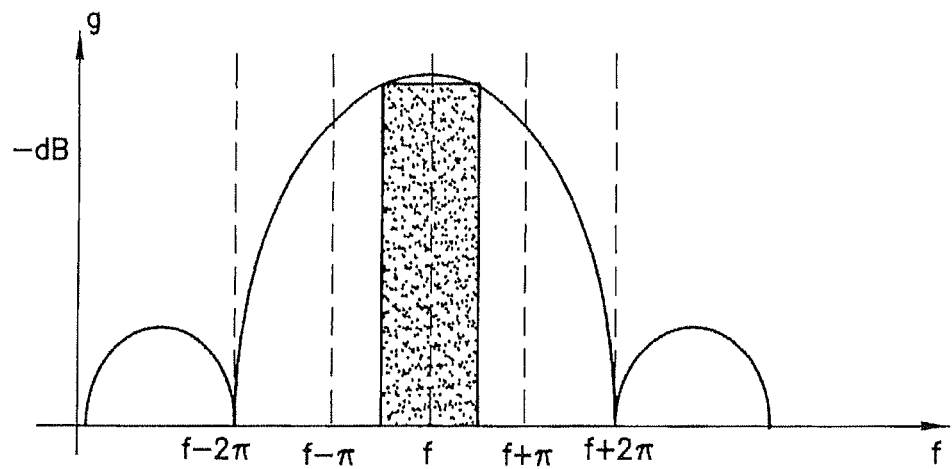
FIGS. 4 and 5 are graphs of a portion of a frequency response curve for an exemplary delay line according to the invention showing modes of oscillation and phase shifting.

Referring now to FIGS. 1, 1a, and 1b, an electronic weighing apparatus 10 includes a base 12 which supports a cantilevered elastic member 14 having a cut-out 15, and upon which a load platform 16 is mounted. The cut-out 15 is provided with two opposed posts 17, 19 upon which are respectively mounted a first piezoelectric transducer 20 and a second piezoelectric transducer 22. As is standard in the art, post 17 is rigidly coupled to base 12, and post 19 is coupled to the elastic member 14. The posts 17, 19 serve to locate the transducers 20, 22 at the center of the elastic member 14 and to mechanically couple the transducers to opposite ends of the elastic member 14. According to one aspect, an auxiliary displacement sensor 18 is also provided. In one embodiment auxiliary displacement sensor 18 is a capacitive sensor with one plate 18a coupled to post 17 and the elastic member 14 serving as the other plate. If desired, a second plate could be attached to the elastic member. Alternatively, plates may be located such that one plate is stationary and the other can move as a function of the weight on platform 16. Other embodiments of an auxiliary displacement sensor include one or more strain gauges coupled to the elastic member 14, or one or more inductive members. As will be discussed in detail hereinafter, according to one aspect, the auxiliary displacement sensor is calibrated initially by the manufacturer, and the weighing apparatus is provided with a mechanism to automatically recalibrate the auxiliary displacement sensor over the life of the apparatus 10.

The first transducer 20 includes a substantially rectangular piezoelectric substrate 20a and a pair of electrodes 20b imprinted on the substrate at the upper end thereof. The second transducer 22 includes a substantially rectangular piezoelectric substrate 22a and a pair of electrodes 22b imprinted on the substrate at the lower end thereof. In one embodiment the substrates are made of lithium niobate. The transducers are arranged with their substrates substantially parallel to each other with a small gap "g" between them. The electrodes 22b of the second transducer 22 are coupled to the input of an amplifier (not shown) powered by a power source (not shown) and the output of the amplifier is coupled to the electrodes 20b of the first transducer 20. The circuit arrangement is the same as shown in the previously incorporated application Ser. No. 08/489,365, previously incorporated herein by reference. The resulting circuit is a positive feedback loop natural oscillator, a "delay line". The output of the amplifier generates an alternating voltage in the electrodes 20b of the first transducer 20 which generates a surface acoustic wave ("SAW") 26 which propagates along the surface of the first transducer substrate 20a away from its electrodes 20b. Since the substrate 20a of the first transducer 20 is relatively close to the substrate 22a of the second transducer 22, an oscillating electric field which is induced as a result of the SAW waves 26 in the piezoelectric substrate 20a is able to in turn induce similar SAW waves 28 on the surface of the second transducer substrate 22a which propagate in the same direction along the surface of the second transducer substrate toward the electrodes 22b of the second transducer 22. The induced waves 28 in the second transducer 22 cause the electrode 22b of the second transducer 22 to produce an alternating voltage which is provided to the input of the amplifier. As long as the gain of the amplifier 24 is larger than the loss of the system, the circuit acts as a natural oscillator with the output of the amplifier having a particular frequency which depends on the physical characteristics of the transducers and their distance from each other, as well as the distance between the respective electrodes of the transducers. In particular, the frequency of the oscillator is directly related to the time it takes for the SAW 26 to propagate from the electrodes 20b to the electrodes 22b.

According to certain embodiments described in more detail below, the SAW 26 has a wavelength of approximately 100-200 microns at 20-50 MHz. In order to limit loss in the system, the gap "g" between the substrates of the first and second transducers is kept small. In one embodiment described below, the gap is 10-20 microns. With such a gap, an oscillating system can typically be generated if the amplifier 24 has a gain of at least approximately 25 dB. It will be appreciated that when a load (not shown) is applied to the load platform 16, the free end of the cantilevered elastic member 14 moves down and causes the second transducer 22 to move relative to the first transducer 20. In particular, it causes the electrodes 22b of the second transducer 22 to move away from the electrodes 20b of the first transducer 20. This results in a lengthening of the "delay line". The lengthening of the delay line causes a decrease in the frequency at the output of the amplifier. The displacement of the elastic member is proportional to the weight of the applied load and the frequency or decrease in frequency at the output of the amplifier can be calibrated to the distance moved by the elastic member.

It will be appreciated that locating the transducers at the center of the elastic member compensates for any torque on the member which would exhibit itself at the free end of the member. This results in an improved accuracy as compared to the weighing instrument disclosed in U.S. Pat. No. 5,663,531. Depending on the application (e.g. maximum load to be weighed), the elastic member is made of aluminum or steel. In one embodiment, the elastic member exhibits a maximum displacement of 0.1 to 0.2 mm at maximum load.

Reflected waves may occur on both piezosubstrates. Reflected waves interfere with the received signal. The interference causes an increase in non-linearity. FIGS. 2 and 3 show an embodiment of anti-reflection structures.

Turning now to FIGS. 2 and 3, one embodiment of transducers 20, 22 (numbered 120, 122) is shown. FIG. 2 illustrates the features of transducer 120 which is substantially identical to transducer 122. FIG. 3 illustrates the transducers mounted on holders 117, 119 to the posts 17, 19 of the elastic member 14 of FIG. 1. As shown in FIG. 2, the transducer 120 includes a lithium niobate substrate 120a with electrodes 120b attached thereto by glue 123. The ends 120c, 120d of the substrate are tapered and polyurethane dampers 121a, 121b are placed at the ends to minimize reflection of the SAW waves.

According to one aspect, the lithium niobate substrate 120a and/or the holder 117 is/are adapted to reduce the stress on the glue when the ambient temperature changes significantly, thereby significantly reducing or eliminating random hysteresis effects and resulting zero shifts. In one embodiment the lithium niobate substrate 120a is adapted by providing a substrate of thickness between 0.25 mm and 0.1 mm. This may be done by grinding down or otherwise reducing the thickness of a thicker (e.g., 0.5 mm) lithium niobate piezosubstrate. The holder 117 is selected to be at least ten times the thickness of the piezosubstrate. In another embodiment, the holder selected to be between 1 and 3.5 times the thickness of the piezosubstrate such that the piezosubstrate and holder bend together like a bimetallic strip when the ambient temperature changes significantly. Thus, by way of example only, if the piezosubstrate is 0.5 mm thick, the holder is selected to be between approximately 0.5 mm and 1.75 mm thick, and if the piezosubstrate is 0.2 mm thick, the holder is selected to be between 0.2 mm and 0.7 mm thick.

Figure 10:
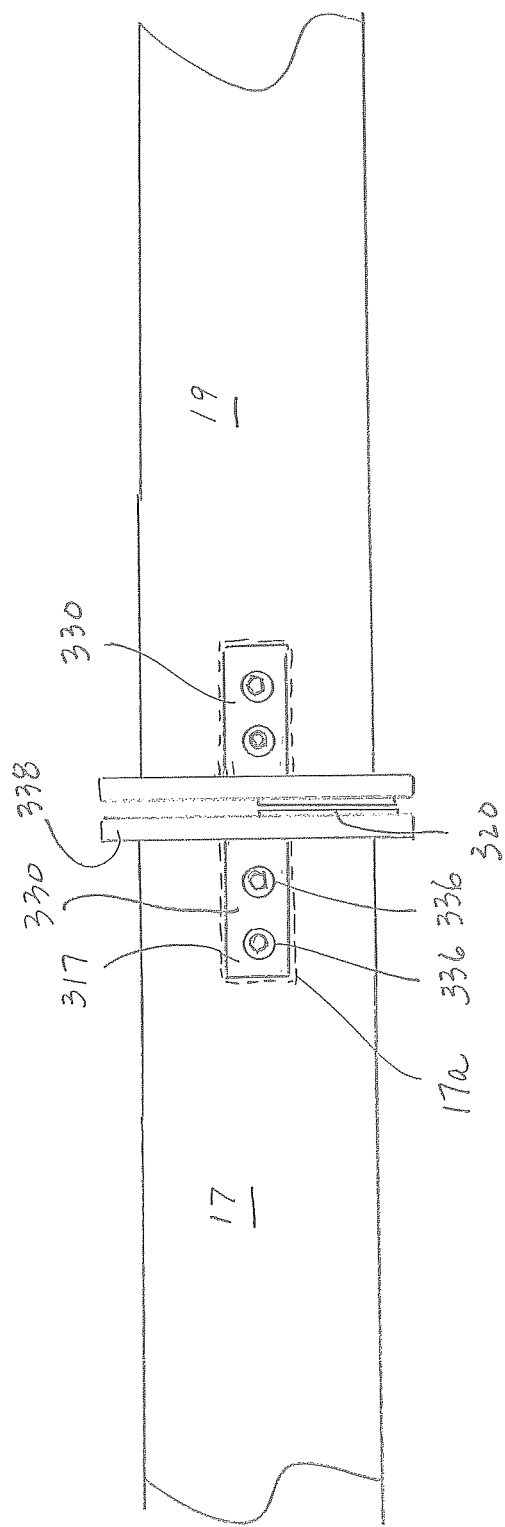
FIG. 10 is an enlarged schematic side elevation view of a pair of transducers according to another embodiment.
Figure 11:
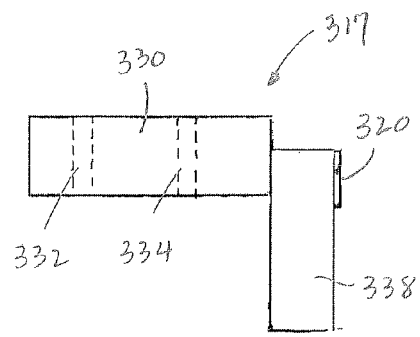
FIG. 11 is a schematic side elevation view of a piezosubstrate on a holder therefor.

Turning now to FIGS. 10 and 11, according to another embodiment of the transducer, the lithium niobate substrate is adapted to have reduced stress on the glue bond when the ambient temperature changes significantly, and consequently significantly reduced or eliminated random hysteresis effects and resulting zero shifts. A holder 317 for mounting the piezosubstrate 320 to arm 17 is provided. The holder 317 includes a support 330 and a substrate mounting face 338. The support 330 includes two holes 332, 330, and extends into a slot 17a in the arm 17 at which it is connected with mounting screws 336 to the arm 17. The substrate mounting face 338 is oriented substantially orthogonal to and vertically offset relative to the end of the support 330. In one embodiment, the holder 317 is machined from a unitary piece of material, e.g., metal, and more particularly, for example, the same aluminum alloy 2024 of which the remainder of the load cell is constructed. Aluminum alloy 2024 has a coefficient of thermal expansion (CTE) of approximately 25 ppm/° C., whereas the CTE of 128° YX lithium niobate substrate (in the direction of SAW propagation) is approximately 15 ppm/° C. Ordinarily, when materials of such different CTEs are bonded to each other and they undergo temperature changes, they are subject to thermal stress. If the temperature changes significantly, the thermal stress could cause some change on the zero reading of the scale. The amount of change is determined by the stress displacement of the substrate which is affected by the internal stress applied to the substrate by the bonding material between the substrate and the holder. Because the bonding material has some level of hysteresis and non-repeatability, the shift of the zero reading can be unpredictable. In order to significantly reduce or eliminate the potentially significant thermal stress that can result along a bonding interface, the substrate can be coupled to the holder as follows.

Figure 14:
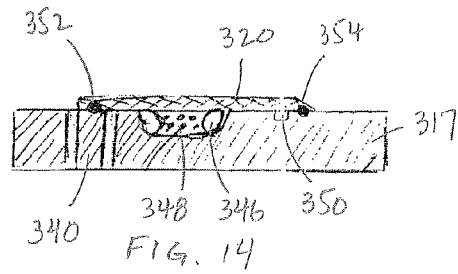
FIG. 14 is a front perspective view of the holder shown in FIG. 12.
Figure 12:
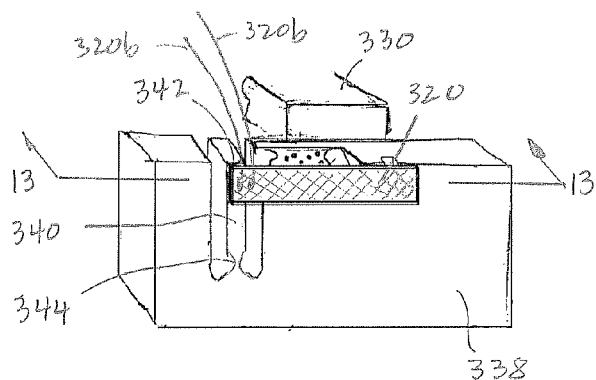
FIG. 12 is a front perspective view of an assembly of the piezosubstrate of the transducer to the holder of FIG. 11 in a manner which reduces thermal stress on the assembly.
Figure 13:
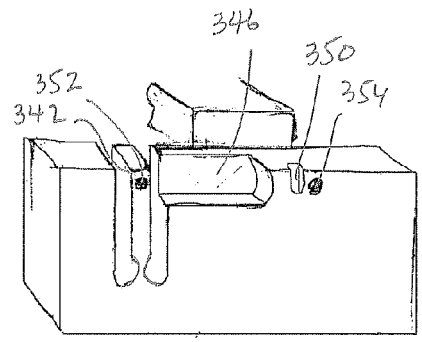
FIG. 13 is a longitudinal section view across line 13-13 in FIG. 12.

In the embodiment of FIGS. 12 through 14, the holder 317 is machined with a cantilevered beam 340 having a free end 342 and a rotation point 344 at which the beam is connected to the mounting face 338 of the holder and about which the beam is permitted relatively free rotation. The mounting face 338 has a first recess 346 for receiving damping adhesive 348 between and in contact with the piezosubstrate 320 and the holder, such as RTV silicone adhesive, to suppress parasitic bulk waves. In one embodiment the adhesive is a relatively soft material so that it will not introduce thermal stress. Suppression of bulk waves prevents distortion of SAW line linearity and therefore maintains linearity of the scale. Linearly spaced from the first recess 346 is a smaller second recess 350 acting a reservoir for bonding agent overflow, as explained further below. If desired or necessary, additional front face recesses can be formed for receiving damping agent or bonding agent overflow.

The substrate 320, provided with electrodes 320b, is bonded with a bonding agent to the face 338 at only two points: the first point 352 at or adjacent at the free end of the cantilevered beam and the second point 354 just to the far side of the second cavity 350. Because the points of bonding are small, the bonding will not introduce thermal stress. Any overflow of bonding agent at one end will flow to the sides of the beam 340, whereas any additional agent at the second end of the substrate will enter the second cavity 350 to ensure that the substrate 320 seats close to and with planarity to the holder face 338. Then, when the piezosubstrate 320 stretches or shrinks due to temperature changes, the beam 340 will bend about the rotation point with the piezosubstrate. Because the expansion or contraction of the piezosubstrate is in a range of at most several microns, and the length of the beam 340 is several thousand microns, it can be assumed that the free end 342 of the beam is moving in the direction of SAW propagation.

Temperature changes that cause the piezosubstrate 320 to expand or shrink a different amount than the face 338 of the holder will not cause significant stress to be applied to the bonding points 352, 354 because the free end 342 of the beam allows thermal expansion of the piezosubstrate without resistance. This can be confirmed, as follows.

First, for comparison purposes, assume a piezosubstrate which is 10 mm in length, 2 mm wide, and 0.5 mm thick bonded to an aluminum substrate holder with a thin layer of bonding agent between the two. Also, assume a holder substrate of 3.3 mm. Because the substrate of the holder is significantly thicker than the piezosubstrate, a change in temperature of approximately 10° C. can cause the piezosubstrate to be stretched by approximately 1 micron. The force applied to the piezosubstrate through the bonding adhesive is calculated as $F=SeE$, where S is cross-sectional area of the piezosubstrate, which is 1 mm$^2$, e is strain, which is 0.0001, and E is Young's modulus of the piezosubstrate, which is 21000 kg/mm$^2$. This corresponds to approximately 2000 grams force.

Now consider the force under the modified assembly. The beam 340 is 1 mm thick in the plane of bending at the rotation point 344, 3.3 mm wide (the thickness of the face 338) and 7.6 mm in length (between the rotation point 344 and the free end 342). When the temperature changes by 10° C., the free end 342 of the beam which is bonded to the piezosubstrate 320 will yield by the same 1 micron and the force required for this amount of bending can be estimated as $F=3dEI/L^3$, where d is the displacement of the free end, which is 1 micron, E is the Young's modulus of the aluminum alloy, which is 7000 kg/mm$^2$, I is a moment of inertia of the beam, which is 0.275 mm$^4$, and L is a length of the beam, which is 7.6 mm. This corresponds to approximately 14 grams of force, less than 1 percent of the force to which the piezosubstrate is subject when adhesive bonded along its entire surface to the holder. Thus, almost all of the stress applied to the bonding points 352, 354 is eliminated with the described assembly. Moreover, the beam 340 is not subject to hysteresis or non-repeatability, because it is manufactured as part of the holder 317 with no special bonding to the holder.

Figure 15:
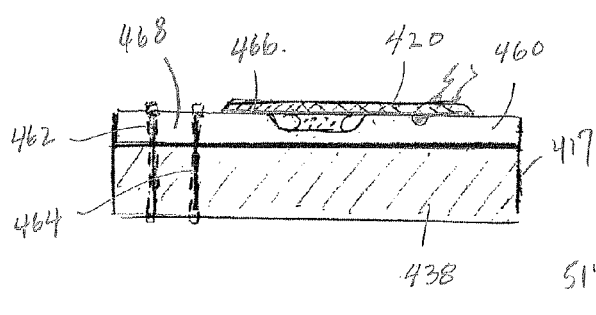
FIG. 15 is a longitudinal section view of another embodiment of an assembly of the piezosubstrate to the holder in a manner which reduces thermal stress on the assembly.

Turning now to FIG. 15, another embodiment of an assembly avoids any bonding agent directly between the piezosubstrate and the plate holder, which have very different CTEs from each other. It is known that the CTE for 128° YX lithium niobate is very different for its different axes. The length of the piezosubstrate, extending along the axis of SAW propagation, is much bigger than the width. Therefore, it is more important to achieve the best match of the respective CTEs of the piezosubstrate and the holder in the direction of SAW propagation, rather than in other directions. The CTE in this direction is CTE of 15 ppm/° C. In accord with this embodiment, an intermediate plate 460 having a CTE approximating that of the piezosubstrate 420 in the direction of SAW propagation is bonded to the face 438 of the holder 417, and the piezosubstrate 420 is bonded to the intermediate plate 460 using a suitable bonding material 466, e.g., epoxy adhesive. One exemplar material for the intermediate plate 460 is stainless steel A316, which has a CTE of 16 ppm/° C. Stainless steel A316 also can be machined and endure high temperature and pressure. In one embodiment the intermediate plate 460 is relatively thick, e.g., 0.06 inch, to maintain a high degree of flatness during machining operations. Importantly, the intermediate plate 460 is bonded to the face 438 of the aluminum alloy holder 417 without an adhesive bonding agent. Rather, to "bond" the intermediate plate 460 and the face 438 of the metal holder 417, two pins 462, 464 are inserted through the plate and holder to stably connect them together. The pins 462, 464 are offset to be located to one side of the adhesive bonding line 466 between the piezosubstrate 420 and the intermediate plate 460, and in one embodiment are spaced relatively close together. In this manner, as the piezosubstrate 420 stretches or shrinks due to temperature changes, the intermediate plate 460 will similarly stretch or shrink without resulting in overstressing the adhesive bond 466 between the piezosubstrate 420 and the intermediate plate 460. Further, all thermal stress is limited to the small space 468 between the pins as the SAW transducer is subject to thermal changes.

Using this assembly, a scale was tested for ranges of temperatures +6° C. to 20° C. and then to 50° C. and then back to between +6° C. to 20° C. several times. The thermal cycling showed very low hysteresis and non-repeatability regarding zero shift. The scale meets NTEP requirements for 1:15000.

Figure 16:
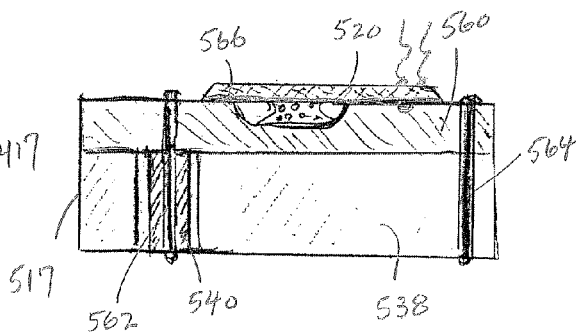
FIG. 16 is a longitudinal section view of yet another embodiment of an assembly of the piezosubstrate to the holder in a manner which reduces thermal stress on the assembly.

It is noted that an intermediate plate 460 of large thickness such as in the assembly of FIG. 15 can be subject to relatively high levels of thermal stress at the pins 462, 464. Thus, referring to FIG. 16, another assembly embodiment is provided in which such thermal stress is essentially eliminated even under harsh cycling conditions. The SAW transducer is fabricated on a lithium niobate piezosubstrate 520, the piezosubstrate 520 is bonded with a bonding agent 566 to an intermediate plate 560 having a CTE that closely matches the piezosubstrate (in the direction of SAW propagation), and the face 538 of the metal holder 517 is machined with a cantilevered beam 540 that is permitted relative free rotation around a rotation point at which the beam is connected to the main body of the holder. The intermediate plate 560 is bonded to the face 538 of the metal holder with two pins 562, 564, one extending into the cantilevered beam 540 on one side of the piezosubstrate 520 and one extending in the face 538 on the other size of the piezosubstrate. As discussed in reference to the embodiment shown in FIGS. 12 through 14, it is appreciated that by coupling the intermediate plate 560 at one end to the cantilevered beam and at its other end of the face 538, without bonding agent extending along the interference therebeneath, thermal stress is effectively eliminated from the assembly.

Figure 5:
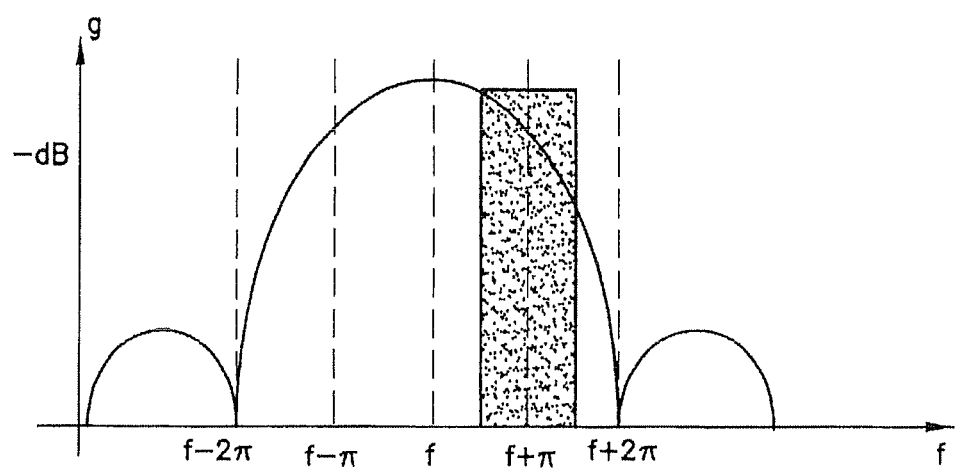

As mentioned above and in the previously incorporated application, the delay line may oscillate in more than one mode and within each mode, the gain will vary as the frequency changes. Referring now to FIGS. 4 and 5, in the idle state, with no weight applied to the scale, the delay line will oscillate at a frequency "f" which is shown in FIG. 4 as the point having the most gain (least loss). The optimal gain area of the graph of FIG. 4 is shown in the shaded area surrounding f and represents a range of ±100 Khz, for example. This area is considered optimal because it is the area of least loss. However, it is not necessarily the area of best phase linearity. After experimenting, it may be discovered that oscillation in a different mode, e.g. the shaded area of FIG. 5, will produce better phase linearity. According to one aspect, the oscillator is forced to oscillate in the mode of best phase linearity by injecting a strong RF signal having a frequency at the midpoint of the desired mode of oscillation. The RF signal is injected by a "push oscillator" coupled to the SAW wave receiver as described in more detail below with reference to FIG. 6. According to one embodiment, the RF signal has a strength of approximately 100 my as compared to the SAW oscillator's strength of approximately 10 my. The RF signal may be injected for a short time (as short as 0.01 seconds) before each weight measurement.

As mentioned above, and described in detail in the previously incorporated applications, the effects of temperature can be further corrected by providing a separate SAW temperature sensor on the same substrate as one of the displacement transducers. According to one embodiment, the SAW displacement oscillator operates at 55 MHz and the SAW temperature oscillator operates at 57 MHz. According to another aspect described in more detail below with reference to FIG. 6, the temperature oscillator is used in conjunction with an adjustable 2 MHz oscillator and a mixer to produce the "push oscillator" frequency and automatically adjust the "push oscillator" frequency for temperature changes.

Figure 6:
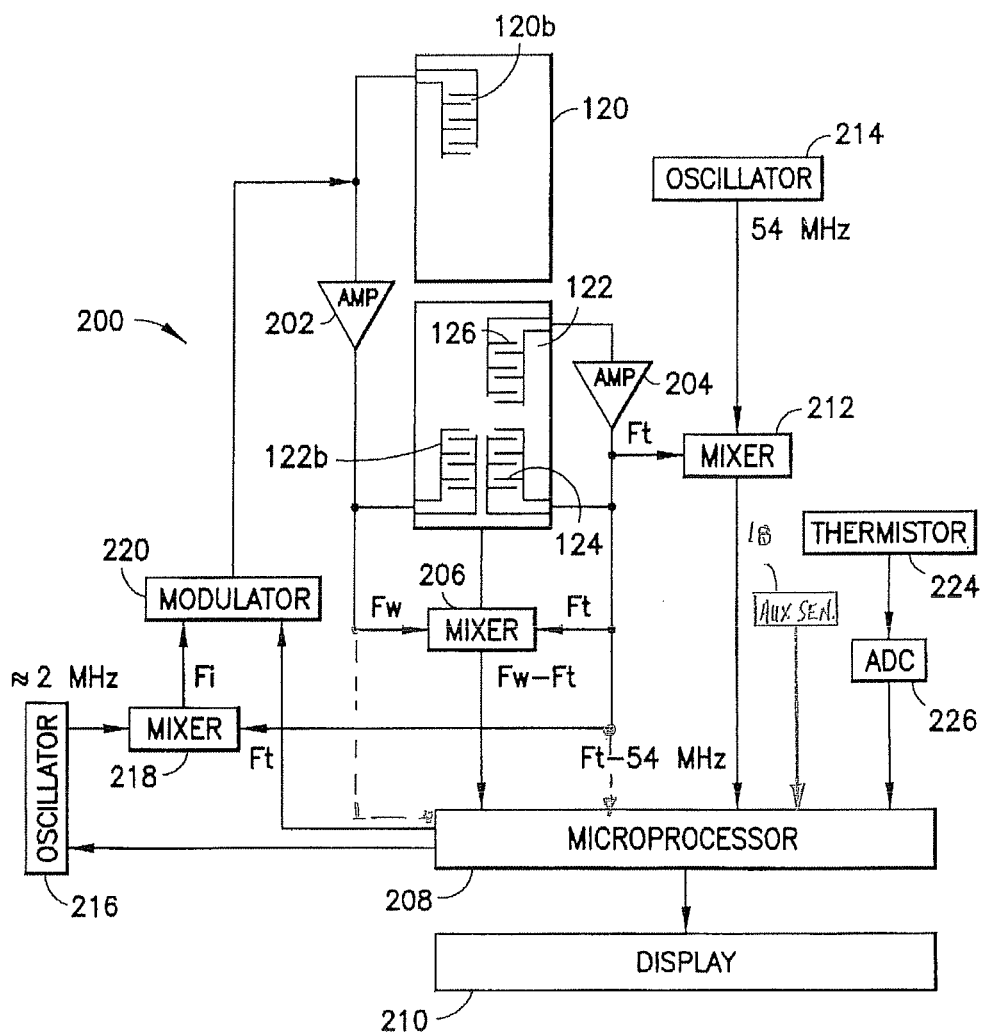
FIG. 6 is a simplified schematic diagram of circuits used in a weighing device.

As seen in FIG. 6, an exemplary circuit 200 includes the displacement SAW transducer formed by the transmitter 122b on the substrate 122 and the receiver 120b on the substrate 120 coupled to each other by the amplifier 202. In addition, the circuit includes a temperature SAW transducer formed by the transmitter 124 and receiver 126 on the substrate 122 coupled to each other by the amplifier 204. The output of amplifier 202 is a frequency Fw which varies according to displacement of the substrates relative to each other, which is an indication of weight when the transducers are arranged as shown in FIG. 1. According to one embodiment, the frequency Fw is nominally 54 MHz. Fw will also vary according to temperature. The output of amplifier 204 is a frequency Ft which varies only according to temperature and humidity and which is nominally 57 MHz. The frequencies Fw and Ft are mixed (subtracted) at the mixer 206 to produce a nominal frequency of 3 MHz which varies according to weight and which is temperature compensated. The output frequency of the mixer 206 is input to a microprocessor 208 which calculates weight as described in the previously incorporated applications and displays the weight on display 210. According to this embodiment, the output Ft of amplifier 204 is also mixed via mixer 212 with a 54 MHz signal from oscillator 214 to produce a signal which is nominally 3 MHz and which varies only with temperature and humidity. The signal Fw-Ft provides a temperature adjusted weight signal which accounts for the affects of temperature on the SAW oscillators. It does not compensate for temperature effects on the Youngs modulus of the elastic member (14 in FIG. 1). The signal output from mixer 212 is a pure temperature indicator and is used to adjust the weight calculation for the effects of temperature on the Youngs modulus of the elastic member.

According to one aspect, a "push oscillator" is formed from an adjustable oscillator 216, a mixer 218, and a modulator 220. The oscillator 216 has a nominal frequency of 2 MHz which is mixed via the mixer 218 with the output of amplifier 204 to produce an output frequency Fi which is (Ft—approx. 2 MHz). This frequency Fi is used to index the modulator 220 which produces the "push oscillator" output to the input of amplifier 202. As shown in FIG. 6, the modulator 220 and the oscillator 216 are both coupled to the microprocessor 208. The microprocessor 208 is programmed to periodically activate the modulator 220 to inject the push frequency as described above. In addition, the microprocessor advantageously is utilized to adjust the oscillator 216 to determine the frequency of the "push oscillator". The oscillator 216 may be initially adjusted via a simple variable resistor or variable capacitor. However, it is further adjusted by the microprocessor during operation of the scale. One of these advantages is that the microprocessor can adjust the oscillator 216 to produce the phase shifting described in the previously incorporated applications. In addition, it can be used to produce much larger frequency shifts than were possible in the previously incorporated applications. This results in more accurate determinations of which weight range the scale is in. As described in the previously incorporated applications, the oscillator operated as a periodic function where the same frequencies were repeated over different weight ranges. A phase shift of +π (was used to determine which weight range the scale was operating in. As the weight increased, the same phase shift produced a larger frequency shift (because of the increased length of the delay line) and the frequency shift could be used to determine the weight range. However, under some circumstances, the phase shift resulted in a frequency shift which was too small to accurately determine. In one embodiment the push oscillator can be used to produce ±4π phase shifts.

As mentioned above, in one embodiment the oscillator 216 is initially adjusted with a variable resistor or variable capacitor to ensure oscillation on the mode of best phase linearity. Initial calibration is performed as follows: Known weights are placed on the scale and the frequency of the oscillator output is determined for different weights and the modes of oscillation are noted. The push oscillator is tuned to operate in one mode and experiments are conducted to measure linearity. The experiments are repeated for each mode. The push oscillator is then tuned to push to the mode of best linearity.

Also, as mentioned above, the auxiliary displacement sensor 18 is initially calibrated by placing known weights on the scale and providing (capacitive) readings. These readings are correlated by the microprocessor 208 to the readings of SAW delay line so that the mode in which the scale is operating can be determined. In other words, and as will be discussed in more detailed below, different loads on the pan or platform 16 can produce the same frequency response in the SAW delay line such that a weight determination cannot be made unless the mode is known. Because the auxiliary displacement sensor 18 has a one-to-one correspondence between output readings and weight (i.e., it does not have multiple modes), it provides information to the microprocessor from which a determination is made as to what mode the system is in. However, it will be recognized by those skilled in the art that the auxiliary sensor will typically be much less accurate and stable than the overall SAW scale. However, for a SAW scale with, e.g., 6 modes and 0.2 mm displacement, the stability of, e.g., a capacitive sensor with 10% change of its capacitance under 100% load should be 0.5% for the temperature range −20° C. to 50° C.

In order to achieve this level of stability, according to one aspect, from time to time (e.g., regularly, such as every day or month, but possibly at random times), the reading of the SAW sensor and the reading of the auxiliary sensor are compared, and the reading of the auxiliary sensor is adjusted (recalibrated) to match the reading of the SAW scale. The reading of the SAW sensor and auxiliary sensor may be done whether or not there is weight on the scale. This comparison and adjustment technique is effective because the primary sensor of a SAW scale, the SAW delay line oscillator, has very good stability (relative drift on the order of 10 parts per million of its central frequency in one year), whereas the reading of the auxiliary sensor is not as stable, but drifts relatively slowly. This means that after proper calibration of the SAW scale auxiliary sensor, it will always show the correct mode number in spite of its inherent instability. This will maintain the high overall accuracy of the scale.

Figure 7:
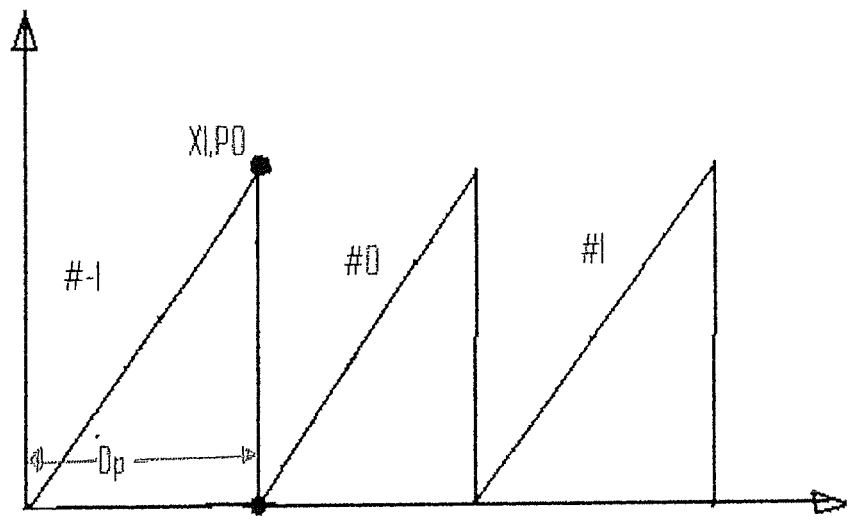
FIG. 7 is a graph plotting load against a frequency function and showing "modes" of operation for an exemplary embodiment.
Figure 8:
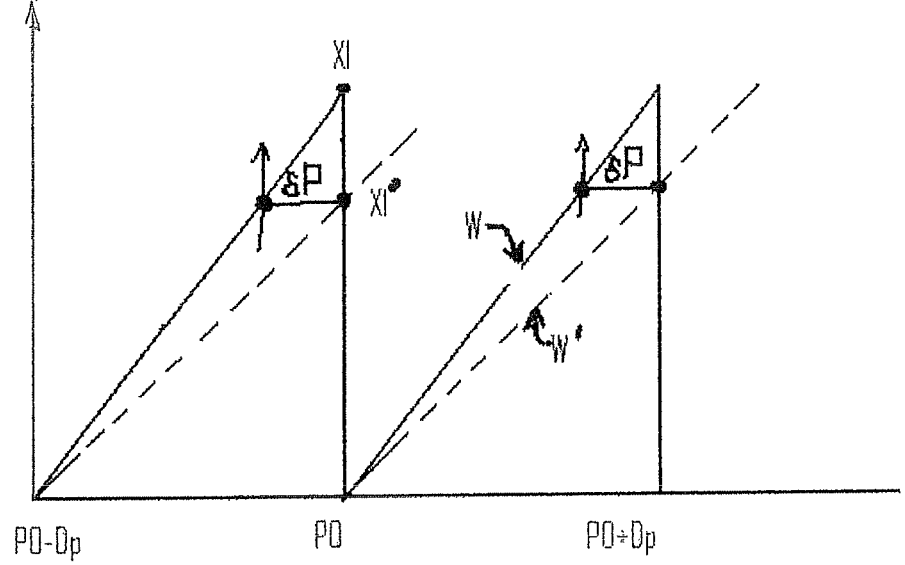
FIG. 8 is a graph showing exemplary changes in the load-frequency function plot due to environmental affects.
Figure 9:
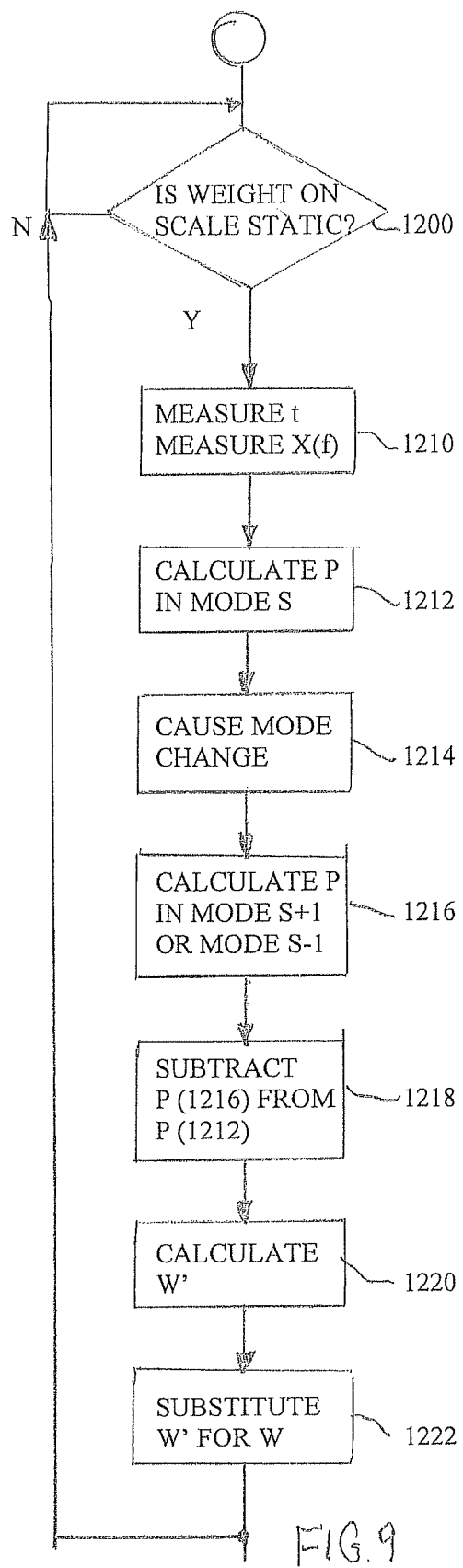
FIG. 9 is a flow chart implemented by the microprocessor of FIG. 6 for automatic recalibration.

Turning now to FIGS. 7-9, a mechanism for automatic recalibration of the scale is provided that reduces span drift. In this aspect, during a period of time when there is no change to a weight applied to the scale (i.e., the weight is static), (e.g., when there is no weight being applied to the scale, or when the weight being applied is steady), readings of SAW transducers that relate to weight indications and environmental factor indications are taken for each one of two adjacent operating modes of the scale, and two calibrated weight calculations are made utilizing those readings. The difference in calibrated weight calculations is then related to a variable utilized to transform the readings into weights, which is updated, thereby recalibrating the scale. Recalibration in this manner significantly reduces span drift and enhances linearity.

More particularly, a load-frequency function graph seen in FIG. 7, where the x-axis indicates weight (P), and the y-axis is a frequency function X(f)=Ft/Fw, with Ft being the SAW reference sensor frequency indication output by amplifier 204 of the delay line oscillation loop 124, 126, 204, and Fw being the SAW weight frequency indication output by amplifier 202 of the delay line oscillation loop 120b, 122b, 202. As will be appreciated by those skilled in the art, FIG. 7 presents a saw-tooth function, where the same frequency function X(f) can represent multiple weights P. This multiple to one mapping is indicative of multiple "modes". In FIG. 7, three modes (−1, 0 and 1) are shown, although the SAW scale can include four, five, six or more modes.

It can be shown that the relationship between the frequency function X(f) and the weight P may be expressed according to the equation:

$$P = [W^*(X-X0)^*\{(N0+S)/N0\}^*AW^*(t-t0)] + [Dp^*S^*AP^*(t-t0)] \quad (1)$$

where W is the inverse of the slope of the zero mode;
X is the value of X(f) at weight P=P;
X0 is the value of X(f) at weight P=P0 (at initial calibration, typically when there is no weight on the scale);
S is the number of the mode (e.g., S= . . . , −2, −1, 0, 1, 2, . . . );
N0 is the number of wavelengths between the transducers of the SAW delay line at P=0;
Dp is a beat period for the scale (i.e., the distance along the x-axis between the saw teeth, which equates to the amount of weight required to cause the scale to change modes) and which is constant for the scale;
AW is the temperature coefficient of the inverse slope, which is determined during an initial calibration process by changing the temperature;
AP is the temperature coefficient of the "beat", which is likewise determined during an initial calibration process;
t is the current temperature; and
t0 is the temperature at the time of initial calibration of the scale.

All of the values in equation (1) are may be determined by the microprocessor 208 or stored in memory associated with the microprocessor 208. X and X0 may be determined indirectly from the outputs of mixers 206 and 212, or, if desired, values of Ft and Fw may be supplied directly (as shown by dotted lines in FIG. 6) to the microprocessor 208. A few points are of note with respect to the variables of equation (1). First, temperature coefficient AW is generally a composite of a number of environmental effects, including the characteristics of the piezosubstrate (typically lithium niobate) of the SAW transducer and the characteristics of the load cell material (typically aluminum). Second, at any specific time, the inverse slope W for all modes will be the same. Third, the weight P0 does not necessarily occur at a transition from one mode (S=−1) to another mode (S=0), although it is shown that way in FIG. 7 for convenience. Fourth, mode 0 does not necessarily start where there is no weight on the scale (pan).

In practice, the SAW scales do not exactly follow equation (1). This is primarily because the SAW IDT (transmitter and receiver of the SAW delay line, known as the Inter Digital Transducer) have different temperature (or environmental) zero shifts for different frequencies (i.e., different weights on the scale) in response to environmental changes and aging processes. In one aspect, this effect is substantially linear, because of the range of frequency that is being used is kept small.

It should be appreciated that the frequency shift due to environment effects at zero will be the same as the frequency shift due to environment at the beginning point of each mode. For example, if there is a shift of 1000 Hz at P0, there will also be a shift of exactly 1000 Hz at P0+Dp and also at P0+2*Dp, etc. But there will not be an exactly 1000 Hz shift at any other point along the graph of each mode. An example of this is seen in FIG. 8.

In the example of FIG. 8, the scale is arranged such that the frequency of the delay line changes by 10 Hz per gram, and the beat period Dp is 30,000 grams which corresponds to 300,000 Hz (300 khz) At temperature t=T1, with zero weight on the platform (i.e., at P=P0), for mode #0, the frequency of the delay line is 93.00 Mhz. The SAW oscillator can then be used to change the mode of measurement from mode #0 to to mode #-1 using a "mode selector". This can be accomplished by the "push oscillator" 216 as previously described or by another means, such as a narrow band filter. For mode #-1, for the same zero weight on the platform, the frequency of the delay line is 93.30 Mhz. If 30,000 grams are placed on the platform of the scale while in mode #0, the frequency of the delay line will also be 93.30 Mhz.

At some later point in time, the calibration of the scale is checked at the same temperature T1. It is found that for P=P0 (no weight on the platform), for mode #0, the frequency of the delay line has stayed the same, i.e., 93.00 Mhz. But for mode #-1, the frequency of the delay line is 93.2998 Mhz—this is a zero shift of −200 Hz. For this example where the frequency of the delayline changes by 10 Hz per gram, a zero shift of −200 Hz corresponds to a shift of (−)20 grams. This same shift of (−)20 g will be seen for every instance where the frequency of the delay line is in the 93.30 Mhz frequency range (i.e., for each mode). As a result, the inverse slope W of the saw-tooth function shown in FIG. 8, is now changed to W'. This can be described by the equation:

$$W' = W*[1-(\partial P/Dp)] \quad (2)$$

where ∂P is the change in weight measurement (i.e., old weight minus new weight), here 20 grams.

In this example W'=W*[1−(20 g/30,000 g)]=W*[1−0.00066]=W*0.999333. It should be noted that in FIG. 8, the change in the inverse slope is highly exaggerated for purposes of illustration.

Now, if W is replaced with W' in equation (1), the value of P will change for every weight for every mode. In this way, the initial calibration for the scale has been corrected without use of any external calibration mass. The result of this recalibration is a significant improvement of the overall accuracy of the scale. For example, the specification for linearity for a five mode SAW scale was enhanced from 1:20000 to 1:60000. Similarly, sensitivity drift was reduced to less than 1 ppm per 1° C. in a range 10° C.-40° C.

FIG. 9 is a flow chart implemented by the microprocessor 208 of FIG. 6 with respect to the automatic recalibration aspect.

At step 1200, a determination is made by microprocessor 208 that the weight on the scale is not changing (i.e., either there is nothing on the platform—a "null load", or the weight on the platform is not changing) for a desired period of time (e.g., one minute, or five minutes, or any other desired amount of time) and that the scale is in a particular mode (denoted mode S for purposes of illustration).

At step 1210, a measurement of temperature t is made as is a measurement of X(f), where X(f)=Ft/Fw. Ft is the SAW reference sensor frequency indication output by amplifier 204 of the delay line oscillation loop 124, 126, 204. Fw is the SAW weight frequency indication output by amplifier 202 of the delay line oscillation loop 120b, 122b, 202.

At step 1212, a value for P is calculated with the scale in mode S according to equation (1) set forth above: P=[W*(X−X0)*{(N0+S)/N0}*AW*(t−t0)]+[Dp*S*AP*(t−t0)], where the variables are as previously defined. These variables are stored in memory by the microprocessor 208.

At step 1214, the delay line with amplifier 202 is caused to operate in an adjacent mode (i.e., mode S+1, or mode S−1), e.g., by causing the push oscillator 216 to provide a different frequency that is injected by modulator 220 and provided to amplifier 202.

At step 1216, a second value for P is calculated according to equation (1) for the scale in the adjacent mode. Then, at step 1218, the second weight measurement is subtracted from first weight measurement to get a weight difference R. With the calculated weight different, a modified inverse of the slope W' is calculated at step 1220 according to equation (2) set forth above: W'=W*[1−(∂P/Dp)]. The calculated value of this variable W' is stored in memory by the microprocessor 208.

At step 1222, the new inverse slope W' is substituted (stored) as the new value for the variable W as a recalibration. In other words, the value for the inverse slope variable W is updated with a new calculated value of W'. Steps 1200-1222 may be repeated on a regular basis or whenever the processor determines at 1200 that the weight on the scale is static.

There have been described and illustrated herein several embodiments of SAW scale improvements and related methods. While particular embodiments have been described, it is not intended that the disclosure be limited thereto, and it is intended that the invention be as broad in scope as the art will allow and that the specification be read likewise. Thus, while particular equations have been disclosed with respect to converting frequency indications to weight determinations, it will be appreciated that other equivalent equations could be used as well. Similarly, while particular modes (e.g., mode 0 and mode −1) were described as being utilized in the recalibration process, it will be appreciated that any adjacent modes could be utilized (e.g., 1 and 2, 0 and 1, etc.) In addition, while particular values of frequencies, frequency shifts, beat periods, etc., were disclosed in particular examples, it will be understood that other values for these variables will be specific for the particular scale. Further, it will be understood that equivalent parts may be used for the described elements. For example, any suitable processor may be used as the "microprocessor". It will therefore be appreciated by those skilled in the art that yet other modifications could be made without deviating from the spirit and scope of the invention.

What is claimed is:

1. An electronic weighing apparatus comprising:
    a) a displaceable elastic member that receives a load is displaced by the load such that the displacement of said elastic member is related to the weight of the load;
    b) a first piezoelectric transducer having a first substrate and one of a first surface acoustic wave (SAW) transmitter and a first SAW receiver, said first piezoelectric transducer being coupled to said elastic member;
    c) a second piezoelectric transducer having a second substrate and the other of said first SAW transmitter and said first SAW receiver, said second piezoelectric transducer being mounted in close proximity to said first piezoelectric transducer such that said displacement of said elastic member causes a corresponding displacement of one of said first and second piezoelectric transducers relative to each other;

d) a first amplifier having an input and an output, said input of said first amplifier being coupled to said first SAW receiver and said output of said first amplifier being coupled to said first SAW transmitter such that said first SAW receiver, said first amplifier and said first SAW transmitter form a first oscillator having a first output, said first oscillator adapted to operate in a plurality of modes including a first mode and a second mode adjacent said first mode;

e) a second SAW receiver;

f) a second SAW transmitter;

g) a second amplifier having an input and an output, said input of said second amplifier being coupled to said second SAW receiver and said output of said second amplifier being coupled to said second SAW transmitter such that said second transducer, said second amplifier, and said second SAW transmitter form a second oscillator having a second output, and said second amplifier output being indicative of environmental factors of said electronic weighing apparatus;

h) a processor coupled to said output of said first amplifier and to said output of said second amplifier, said processor storing initial calibration information for said electronic weighing apparatus, said processor determining from said initial calibration information and from indications of said first oscillator output and said second oscillator output an indication of the weight (P) of the load at a first time, said processor further adapted to determine that the load is static and to receive indications of said first oscillator output in each of said first and second modes and indications from said second oscillator output and to generate therefrom updated calibration information which is stored by said processor and used to determine an indication of the weight of the load at a subsequent second time.

2. An electronic weighing apparatus according to claim 1, further comprising:
a push oscillator coupled to processor and to said first SAW receiver and to said second SAW receiver, said push oscillator causing said first oscillator to operate in said plurality of modes.

3. An electronic weighing apparatus according to claim 1, wherein:
said plurality of modes are numbered,
said initial calibration information includes an inverse of the slope of a weight/frequency-function function (W) of the first mode, the number of wavelengths between said first and second piezoelectric transducers when there is no weight on said weighing apparatus (N0), a beat period for the weighing apparatus (Dp), a temperature coefficient AW of the inverse slope, a temperature coefficient AP of the beat period, an initial frequency function value X0, and the temperature at the time of initial calibration of the scale t0, and
said processor determines said indication of weight P according to $$P=[W*(X-X0)*\{(N0+S)/N0\}*AW*(t-t0)]+[Dp*S*AP*(t-t0)]$$

where X is the value of a frequency function X(f) at weight P=P where said frequency function X(f) =Ft/Fw, with Ft being the frequency indication output by said second amplifier and Fw being the frequency indication output by said first amplifier, said X0 is a value of X(f) when there is no weight on the weighing apparatus, S is the number of the mode, and t is the current temperature.

4. An electronic weighing apparatus according to claim 3, wherein:
said updated calibration information which is stored by said processor is an updated calibration information for the inverse of the slope, and said processor generates said updated calibration information according to W'=W * [1−(∂P/Dp)], where W' is said updated calibration information for the inverse of the slope, and ∂P is the difference in said indications of weight of the load between said first and second modes.

5. An electronic weighing apparatus according to claim 1, wherein:
said plurality of modes comprises at least five modes.

6. An electronic weighing apparatus according to claim 1, wherein:
said plurality of modes includes a zero mode, and said first mode is said zero mode.

7. An electronic weighing apparatus according to claim 1, further comprising:
an auxiliary displacement sensor electrically coupled to said processor.

8. A method using an electronic weighing apparatus where the electronic weighing apparatus includes (i) a displaceable elastic member that receives a load and is displaced by the load such that the displacement of said elastic member is related to the weight of the load, (ii) a first piezoelectric transducer having a first substrate and one of a first surface acoustic wave (SAW) transmitter and a first SAW receiver, said first piezoelectric transducer being coupled to said elastic member, (iii) a second piezoelectric transducer having a second substrate and the other of said first SAW transmitter and said first SAW receiver, said second piezoelectric transducer being mounted in close proximity to said first piezoelectric transducer such that said displacement of said elastic member causes a corresponding displacement of one of said first and second piezoelectric transducers relative to each other, (iv) a first amplifier having an input and an output, said input of said first amplifier being coupled to said first SAW receiver and said output of said first amplifier being coupled to said first SAW transmitter such that said first SAW receiver, said first amplifier and said first SAW transmitter form a first oscillator having a first output, said first oscillator adapted to operate in a plurality of modes including a first mode and a second mode adjacent said first mode, (v) a second SAW receiver, (vi) a second SAW transmitter, (vii) a second amplifier having an input and an output, said input of said second amplifier being coupled to said second SAW receiver and said output of said second amplifier being coupled to said second SAW transmitter such that said second transducer, said second amplifier, and said second SAW transmitter form a second oscillator having a second output, and said second amplifier output being indicative of environmental factors of said electronic weighing apparatus, and (viii) a processor coupled to said output of said first amplifier and to said output of said second amplifier, said processor storing first calibration information for said electronic weighing apparatus, the method comprising:

a) using the processor, determining over a period of time that there is no change to a first load applied to the weighing apparatus;

b) using the processor, determining from said first calibration information and from indications of said first oscillator output and said second oscillator output a first indication of the weight of the first load, said first oscillator functioning in a first mode;

c) causing said first oscillator to move from said first mode to a second mode adjacent said first mode;
d) using the processor, and with said first oscillator functioning in said second mode, determining from said first calibration information and from indications of said first oscillator output and said second oscillator output a second indication of the weight of the load;
e) taking a difference between said first indication of the weight of the first load and second indication of the weight of the first load; and
f) using said difference, updating said first calibration information to provide updated calibration information; and
g) storing said updated calibration information in memory.

9. A method according to claim 8, further comprising:
h) using said updated calibration information stored in the memory to determine an indication of the weight of a second load applied to said electronic weighing device.

10. A method according to claim 9, wherein:
said first load is a null load.

11. A method according to claim 9, wherein:
said updated calibration information comprises updated calibration information for an inverse of a slope of a weight to frequency-function function, and said updating is according to $W'=W * [1-(\partial P/Dp)]$, where $W'$ is said updated calibration information for the inverse of the slope, $Dp$ is a beat period for the weighing apparatus, and $\partial P$ is said difference.

12. A method according to claim 9, further comprising:
with said updated calibration information instead of said first calibration information, repeating steps a) through h) for one of said second load and a new load.

13. A method according to claim 9, wherein:
said electronic weighing apparatus further includes a push oscillator coupled to said processor and to said first SAW receiver, and said causing said first oscillator to move from said first mode to a second mode adjacent said first mode is accomplished by a change of frequency of said push oscillator.

* * * * *